(12) United States Patent
Kubota et al.

(10) Patent No.: US 8,879,173 B2
(45) Date of Patent: Nov. 4, 2014

(54) IMAGING LENS

(71) Applicants: Optical Logic Inc., Ina (JP); Kantatsu Co., Ltd., Yaita (JP)

(72) Inventors: Yoji Kubota, Ina (JP); Kenichi Kubota, Ina (JP); Hitoshi Hirano, Ina (JP); Tomohiro Yonezawa, Yaita (JP)

(73) Assignees: Optical Logic Inc., Nagano (JP); Kantatsu Co., Ltd., Tochigi (JP)

( * ) Notice: Subject to any disclaimer, the term of this patent is extended or adjusted under 35 U.S.C. 154(b) by 22 days.

(21) Appl. No.: 13/659,303

(22) Filed: Oct. 24, 2012

(65) Prior Publication Data
US 2013/0107378 A1  May 2, 2013

(30) Foreign Application Priority Data
Oct. 28, 2011  (JP) ................................ 2011-236598

(51) Int. Cl.
*G02B 9/34* (2006.01)
*G02B 13/18* (2006.01)
*G02B 3/02* (2006.01)
*G02B 13/04* (2006.01)
*G02B 13/00* (2006.01)

(52) U.S. Cl.
CPC .............. *G02B 13/004* (2013.01); *G02B 13/04* (2013.01)

USPC ........................................... 359/781; 359/715

(58) Field of Classification Search
USPC .................................................. 359/781, 715
See application file for complete search history.

(56) References Cited

U.S. PATENT DOCUMENTS 7,660,049 B2 * 2/2010 Tang .............................. 359/781
7,848,032 B1 * 12/2010 Chen et al. .................... 359/715

FOREIGN PATENT DOCUMENTS

JP     2004-361934 A    12/2004
JP     2005-031638 A     2/2005

* cited by examiner

*Primary Examiner* — Alicia M Harrington
(74) *Attorney, Agent, or Firm* — Kubotera & Associates, LLC

(57) ABSTRACT

An imaging lens includes a first lens and a third lens having negative refractive power, and a second lens and a fourth lens having positive refractive power. Curvature radiuses of surfaces of the first lens on an object side and an image plane side are positive. A curvature radius of a surface of the second lens on the object side is positive. Curvature radiuses of surfaces of the third lens on the object side and the image plane side are negative. Curvature radiuses of surfaces of the fourth lens on the object side and the image plane side are positive. The first lens has a focal length f1 and the second lens has a focal length f2, so that the following conditional expression is satisfied:

$-0.6 < f2/f1 < -0.1$.

4 Claims, 15 Drawing Sheets

IMAGING LENS

BACKGROUND OF THE INVENTION AND RELATED ART STATEMENT

The present invention relates to an imaging lens for forming an image of an object on an imaging element such as a CCD sensor and a CMOS sensor. Particularly, the present invention relates to an imaging lens suitable for mounting on a camera in portable devices such as a cellular phone and a portable information terminal or a relatively small camera such as a digital still camera, a security camera, an onboard camera, and a network camera.

In these years, almost any models of cellular phones have built-in cameras for further added values as the cellular phones. Functions of such cameras have been more sophisticated each year, and especially resolution has been improved significantly. Recently, some of those devices even include built-in cameras with functions that are comparable to those of digital still cameras. On the other hand, so-called smart-phones, which have combined functions of a cellular phone and a portable information terminal (PDA) or a personal computer, are now available and have been purchased more popularly than the cellular phones. Since one of the features of the smart-phones is multifunctional, the smart-phones often include built-in cameras similarly to those of the cellular phones.

An imaging lens for mounting in a camera such as the cellular phone and the smart-phone requires a small size as well as sufficient optical performance that is compatible to the resolution of an imaging element. Conventionally, by using an imaging lens with a two-lens or three-lens configuration, the sufficient optical performance is secured and miniaturization is also attained. However, as the resolution of the imaging element becomes higher, the required optical performance becomes more challenging, and it becomes difficult to sufficiently correct aberrations with the two- or three-lens configuration. Further, it is also difficult to secure the required optical performance.

Moreover, the camera mounted in the cellular phone or the smart-phone is sometimes used for a video call or a self portrait. For example, a person may hold the cellular phone to take a photo with a friend or a photo of the self portrait with a landscape as a background, being a popular way of using the cellular phone especially among young people. In such a case, since the person who takes the photo is an object of the picture to be taken, the imaging lens mounted in the cellular phone requires a larger image-taking range, i.e., a wider angle of view. Furthermore, with improvements of the resolution of the imaging element, there is another common way of enjoying a picture by clipping a desired range from the taken picture. In these uses, the imaging lens is required to have an even wider angle of view and a higher resolution than before.

To this end, a four-lens configuration is considered to be most suitable to solve the above-described problems. As the lens configuration formed of four lenses, for example, the imaging lenses described in Patent Reference 1 and Patent Reference 2 have been developed. Each of the imaging lenses disclosed in Patent References 1 and 2 includes a first lens that is a meniscus lens directing a concave surface thereof to an object side and has negative power; a second lens that is a biconvex lens; a third lens that is a meniscus lens directing a concave surface thereof to the object side and has negative power; and a fourth lens that has positive power.

In the configuration described above, by forming the first lens as the meniscus lens directing the concave surface thereof to the object side, it is possible to attain a wider angle of view of the imaging lens. In addition, by forming the third lens as the meniscus lens directing the concave surface thereof to the object side, it is possible to keep an angle between an incident ray and an emergent ray (angle of deviation) small and restrain generation of aberrations at each refracting surface.

Patent Reference 1: Japanese Patent Application Publication No. 2004-361934
Patent Reference 2: Japanese Patent Application Publication No. 2005-31638

According to the imaging lenses described in Patent References 1 and 2, it is possible to obtain relatively satisfactory aberrations. The functions of the cellular phones and the smart-phones have been more sophisticated each year, and even further miniaturization has been required for the imaging lenses. According to the lens configurations described in Patent References 1 and 2, it is difficult to attain the wide angle while attaining both the miniaturization of the imaging lens and the satisfactory aberration correction so as to meet those demands.

Here, such a challenge is not specific to the imaging lens mounted in the small-sized portable devices such as the cellular phones and the smart-phones, but also a challenge for an imaging lens for mounting in a relatively small camera such as digital still cameras, portable information terminals, security cameras, onboard cameras, and network cameras.

In view of the above-described problems in the conventional techniques, an object of the present invention is to provide an imaging lens that can satisfactorily correct aberrations despite of a small size and have a relatively wide angle.

Further objects and advantages of the invention will be apparent from the following description of the invention.

SUMMARY OF THE INVENTION

In order to solve the above-described problems, according to a first aspect of the present invention, an imaging lens includes a first lens having negative refractive power; a second lens having positive refractive power; a third lens having negative refractive power; and a fourth lens having positive refractive power, arranged in this order from an object side to an image plane side. The first lens is formed in a shape so that a curvature radius of a surface thereof on the object side and a curvature radius of a surface thereof on the image plane side are both positive. The second lens is formed in a shape so that a curvature radius of a surface thereof on the object side is positive. Further, the third lens is formed in a shape so that a curvature radius of a surface thereof on the object side and a curvature radius of a surface thereof on the image plane side are both negative. The fourth lens is formed in a shape so that a curvature radius of a surface thereof on the object side and a curvature radius of a surface thereof on the image plane side are both positive.

According to the first aspect of the present invention, the first lens has a focal length f1 and the second lens has a focal length f2, so that the following conditional expression (1) is satisfied:

$$-0.6 < f2/f1 < -0.1 \qquad (1)$$

Generally, in order to attain a wider angle of view in an imaging lens, it is necessary to shorten a focal length of the imaging lens. When a focal length of the imaging lens is short, however, a back focal length is short, so that it is difficult to secure a space for disposing an insert such as an infrared cutoff filter and a cover glass between the imaging lens and an imaging element. For this reason, in the imaging lens in the first aspect of the present invention, while widening the angle of view by using the lens having the negative refractive power as the first lens, a sufficient back focal length is secured and also miniaturization of the imaging lens is attained by forming the first lens in the shape so that the curvature radius of the object-side surface thereof and the curvature radius of the image plane-side surface thereof are both positive, so as to have the shape of the meniscus lens directing a convex surface thereof to the object side near an optical axis. Since the first lens has the shape of the meniscus lens near the optical axis, a position of a principal point is provided on the image-plane side, so that it is possible to both attain the miniaturization of the imaging lens and secure the sufficient back focal length.

When the imaging lens satisfies the conditional expression (1), it is possible to attain the wider angle of view in the imaging lens, and at the same time it is possible to satisfactorily correct a chromatic aberration and an astigmatism. When the value exceeds the upper limit "−0.1", the first lens has weak refractive power in relation to the second lens, so that an axial chromatic aberration is insufficiently corrected (a focal position at a short wavelength moves towards the object side in relation to a focal position at a reference wavelength). Furthermore an astigmatic difference increases. As a result, it is difficult to obtain the satisfactory image-forming performance. In addition, since the negative refractive power of the first lens is weak, it is difficult to attain the wider angle of view in the imaging lens and also difficult to secure the back focal length.

On the other hand, when the value is below the lower limit "−0.6", the first lens has the strong refractive power in relation to the second lens, although it is advantageous for attaining the wider angle of view, the axial chromatic aberration is excessively corrected (a focal position at a short wavelength moves towards an image-plane side in relation to a focal position at a reference wavelength). Moreover, in the astigmatism, especially a sagittal image surface is curved towards the image plane side, and a field curvature is excessively corrected. In addition, an inner coma aberration due to an off-axis ray easily occurs and it is difficult to obtain the satisfactory image-forming performance.

According to a second aspect of the present invention, in the imaging lens having the above-described configuration, the whole lens system has a focal length f and the object-side surface of the first lens has the curvature radius R1$f$, so that the following conditional expression (2) is preferably satisfied:

$$0 < f/R1f < 2.0 \tag{2}$$

When the imaging lens satisfies the conditional expression (2), it is possible to satisfactorily correct a distortion and the field curvature, while attaining the miniaturization of the imaging lens. When the value exceeds the upper limit "2.0", although it is advantageous for attaining the miniaturization and correcting the distortion, the imaging surface curves towards the object side and it is difficult to obtain the satisfactory image-forming performance. On the other hand, when the value is below the lower limit "0", it is difficult to attain the miniaturization and a minus distortion increases, so that it is difficult to obtain the satisfactory image-forming performance.

According to a third aspect of the present invention, in the imaging lens having the above-described configuration, the whole lens system has the focal length f and an object-side surface of the second lens has a curvature radius R2$f$, so that the following conditional expression (3) is preferably satisfied:

$$0.15 < R2f/f < 0.35 \tag{3}$$

When the imaging lens satisfies the conditional expression (3), it is possible to satisfactorily correct a coma aberration and the chromatic aberration, while attaining the miniaturization of the imaging lens. When the value exceeds the upper limit "0.35", the second lens has weak refractive power, so that the axial chromatic aberration is excessively corrected and an off-axis chromatic aberration of magnification is insufficiently corrected (an imaging point at a short wavelength moves towards the optical axis in relation to the imaging point at a reference wavelength). In addition, the outer coma aberration due to an off-axis ray easily occurs, and it is difficult to obtain the satisfactory image-forming performance. On the other hand, when the value is below the lower limit "0.15", although it is advantageous for attaining the miniaturization, the inner coma aberration due to the off-axis ray easily occurs and it is difficult to obtain the satisfactory image-forming performance.

According to a fourth aspect of the present invention, in the imaging lens having the above-described configuration, the fourth lens has a focal length f4, so that the following conditional expression (4) is preferably satisfied:

$$0.7 < f2/f4 < 1.0 \tag{4}$$

In case of using an imaging element such as a CCD sensor and a CMOS sensor, it is necessary to minimize an incident angle of a principal ray to the imaging element as much as possible. When the incident angle of the principal ray is increased, actual aperture efficiency decreases at an image periphery, so that peripheral brightness decreases due to a shading phenomenon. When the imaging lens satisfies the conditional expression (4), it is possible to satisfactorily correct the field curvature and the distortion, while restraining the incident angle of the principal ray.

When the value exceeds the upper limit "1.0", the fourth lens has the strong refractive power in relation to the second lens, so that the back focal length is long in relation to the focal length of the whole lens system and it is difficult to attain the miniaturization of the imaging lens. In addition, in the astigmatism, the sagittal image surface curves towards the image-plane side and the astigmatic difference and the distortion increase. For this reason, it is difficult to obtain the satisfactory image-forming performance.

On the other hand, when the value is below the lower limit "0.7", although it is advantageous for attaining the miniaturization of the imaging lens, since the back focal length is short in relation to the focal length of the whole lens system, it is difficult to secure a space for disposing the insert such as the infrared cutoff filter and the cover glass. Moreover, a periphery of the image-forming surface curves towards the object side and the distortion increases, so that it is difficult to obtain the satisfactory image-forming performance.

According to a fifth aspect of the present invention, in the imaging lens having the above-described configuration, the third lens has a focal length f3 and the fourth lens has the focal length f4, so that the following conditional expression (5) is preferably satisfied:

$$0.7 < |f3/f4| < 1.0 \tag{5}$$

When the imaging lens satisfies the conditional expression (5), it is possible to more satisfactorily correct the chromatic aberration and the distortion. When the value exceeds the upper limit "1.0", the negative refractive power of the third lens is relatively weak in relation to the positive refractive power of the fourth lens, so that the off-axis chromatic aberration of magnification is insufficiently corrected. Further, in the astigmatism, the sagittal image surface curves towards the object side, and it is difficult to obtain the satisfactory image-forming performance.

On the other hand, when the value is below the lower limit "0.7", since the negative refractive power of the third lens is relatively strong, the off-axis chromatic aberration of magnification is excessively corrected (an image-forming point at a short wavelength moves in a direction to be away from the optical axis in relation to an image-forming point at a reference wavelength), and the image-forming surface curves towards the image plane side. Moreover, a plus distortion increases and it is difficult to obtain the satisfactory image-forming performance.

According to a sixth aspect of the present invention, in the imaging lens having the above-described configuration, the image plane-side surface of the third lens has a curvature radius R3r and the object-side surface of the fourth lens has a curvature radius R4f, so that the following conditional expression (6) is preferably satisfied:

$$-2.0 < R3r/R4f < -0.5 \quad (6)$$

When the imaging lens satisfies the conditional expression (6), it is possible to satisfactorily correct the chromatic aberration while restraining the incident angle of the principal ray to the imaging element. When the value exceeds the upper limit "−0.5", both the third lens and the fourth lens have the weak refractive powers, and the axial chromatic aberration is insufficiently corrected. For this reason, it is difficult to attain the satisfactory image-forming performance. In addition, the incident angle of the principal ray is large, and reduction of the peripheral brightness due to the shading phenomenon easily occurs. On the other hand, when the value is below the lower limit "−2.0", although it is easy to restrain the incident angle of the principal ray to the imaging element, the axial chromatic aberration and the off-axis chromatic aberration of magnification are excessively corrected. Therefore, also in this case, it is difficult to obtain the satisfactory image-forming performance.

Furthermore, in order to more satisfactorily correct the chromatic aberrations, the imaging lens having the above-described configuration preferably satisfies the following conditional expression (6A):

$$-1.8 < R3r/R4f < -0.8 \quad (6A)$$

According to the imaging lens of the invention, it is possible to attain both the miniaturization and the satisfactory aberration correction of the imaging lens, and it is possible to provide the imaging lens with the relatively wide angle of view.

DETAILED DESCRIPTION OF PREFERRED EMBODIMENTS

Hereunder, referring to the accompanying drawings, an embodiment of the present invention will be fully described.

FIGS. 1, 4, 7, 10, and 13 are sectional views of imaging lenses in Numerical Data Examples 1 to 5 according to the embodiment, respectively. Since a basic lens configuration is the same among those Numerical Data Examples, the lens configuration of the embodiment will be described with reference to the illustrative sectional view of Numerical Data Example 1.

Figure 1:
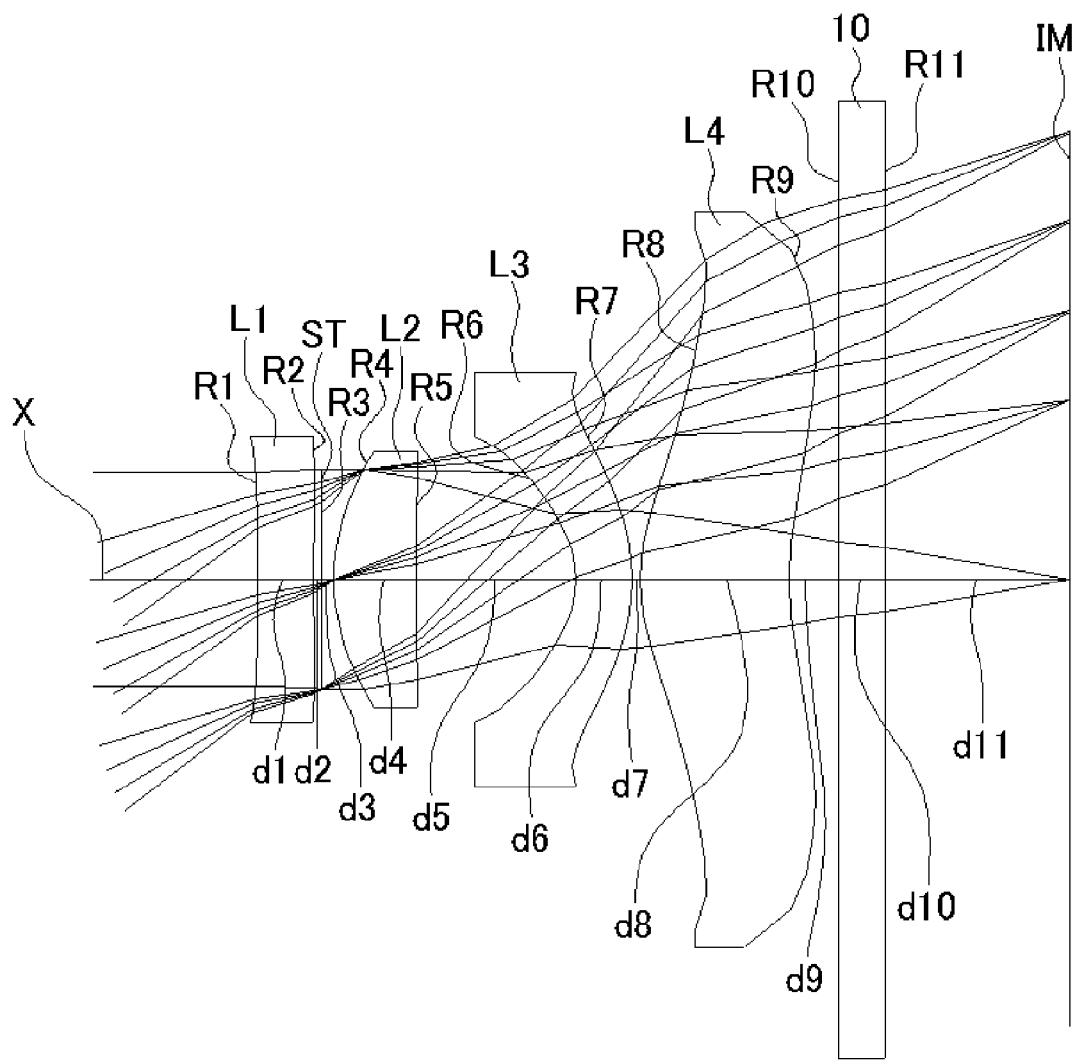
FIG. 1 shows an illustrative sectional view of a configuration of an imaging lens in Numerical Data Example 1 according to an embodiment of the invention.

As shown in FIG. 1, the imaging lens of the embodiment includes a first lens L1 having negative refractive power, an aperture stop ST, a second lens L2 having positive refractive power, a third lens L3 having negative refractive power, and a fourth lens L4 having positive refractive power, arranged in the order from an object side to an image plane side. A filter 10 may be provided between the fourth lens L4 and an image plane IM. The filter 10 may be optionally omitted.

According to the imaging lens having the above-described configuration, the first lens L1 is formed in a shape so that a curvature radius R1 of an object-side surface thereof and a curvature radius R2 of an image plane-side surface thereof are both positive so as to have a shape of a meniscus lens directing a convex surface thereof to the object side near an optical axis X.

The second lens L2 is formed in a shape so that a curvature radius R4 of an object-side surface thereof and a curvature radius R5 of an image plane-side surface thereof are both positive so as to have a shape of a meniscus lens directing a convex surface thereof to the object side near the optical axis X. Here, such shape of the second lens L2 is not limited to the shape of the meniscus lens. The shape of the second lens L2 can be any as long as the curvature radius R4 of the object-side surface thereof is positive. For example, the second lens L2 may be formed in a shape so that the curvature radius R4 of the object-side surface thereof is positive and the curvature radius R5 of the image plane-side surface thereof is negative, i.e. a shape of a biconvex lens near the optical axis X. Alternatively, by forming the image plane-side surface of the second lens L2 as an aspheric surface, the second lens L2 may be formed in a shape so as to be a biconvex lens near the optical axis X and have a shape of a meniscus lens as a whole. In this case, there is an inflection point on the image plane-side surface of the second lens L2. The imaging lenses in Numerical Data Examples 1, 2, and 4 are examples, in which the second lens L2 has a shape of a meniscus lens directing a convex surface thereof to the object side near the optical axis X. Numerical Data Examples 3 and 5 are examples in which the second lens L2 has a shape of a biconvex lens near the optical axis X.

The third lens L3 is formed in a shape so that a curvature radius R6 of the object-side surface thereof and a curvature radius R7 of the image plane-side surface thereof are both negative so as to have a shape of a meniscus lens directing a concave surface thereof to the object side near the optical axis X. The fourth lens L4 is formed in a shape so that a curvature radius R8 of an object-side surface thereof and a curvature radius R9 of an image plane-side surface thereof are both positive and has a shape of a meniscus lens directing a convex surface thereof to the object side near the optical axis X. In addition, the object-side surface and the image plane-side surface of the fourth lens L4 are formed as an aspheric shape so as to be convex to the object side near the optical axis X and concave to the object side at the periphery. With such shape of the fourth lens L4, it is possible to suitably restrain an incident angle of a ray emitted from the imaging lens to the image plane IM.

The imaging lens of the embodiment satisfies the following conditional expressions (1) to (6). Therefore, according to the imaging lens of the embodiment, it is possible to attain both miniaturization of the imaging lens and satisfactory aberration correction.

$-0.6 < f2/f1 < -0.1$ (1)

$0 < f/R1f < 2.0$ (2)

$0.15 < R2f/f < 0.35$ (3)

$0.7 < f2/f4 < 1.0$ (4)

$0.7 < |f3/f4| < 1.0$ (5)

$-2.0 < R3r/R4f < -0.5$ (6)

In the above conditional expressions:
f: Focal length of the whole lens system
f1: Focal length of a first lens L1
f2: Focal length of a second lens L2
f3: Focal length of a third lens L3
f4: Focal length of a fourth lens L4
R1f: Curvature radius of an object-side surface of the first lens L1
R2f: Curvature radius of an object-side surface of the second lens L2
R3r: Curvature radius of an image plane-side surface of the third lens L3
R4f: Curvature radius of an object-side surface of the fourth lens L4

In order to more satisfactorily correct chromatic aberrations, the imaging lens of the embodiment further satisfies the following conditional expression (6A):

$-1.8 < R3r/R4f < -0.8$ (6A)

Here, it is not necessary to satisfy all of the conditional expressions, and it is possible to obtain an effect corresponding to the respective conditional expression when any single one of the conditional expressions is individually satisfied.

In the embodiment, any lens surfaces of the first lens L1 to the fourth lens L4 are formed as an aspheric surface. When the aspheric surfaces applied to the lens surfaces have an axis Z in a direction of the optical axis, a height H in a direction perpendicular to the optical axis, a conical coefficient k, and aspheric coefficients $A_4$, $A_6$, $A_8$, $A_{10}$, $A_{12}$, $A_{14}$, and $A_{16}$, a shape of the aspheric surfaces of the lens surfaces may be expressed as follows:

$$Z = \frac{\frac{H^2}{R}}{1+\sqrt{1-(k+1)\frac{H^2}{R^2}}} + A_4 H^4 + A_6 H^6 +$$ [Formula 1]

$$A_8 H^8 + A_{10} H^{10} + A_{12} H^{12} + A_{14} H^{14} + A_{16} H^{16}$$

Next, Numerical Data Examples of the imaging lens of the embodiment will be described. In each Numerical Data Example, f represents a focal length of the whole lens system, Fno represents an F number, and ω represents a half angle of view, respectively. In addition, i represents a surface number counted from the object side, R represents a curvature radius, d represents a distance between lens surfaces (surface spacing) on the optical axis, Nd represents a refractive index for a d line (a reference wavelength), and vd represents Abbe's number for the d line, respectively. Here, aspheric surfaces are indicated with surface numbers i affixed with * (asterisk).

Numerical Data Example 1

Basic data are shown below.

| f = 3.86 mm, Fno = 2.9, ω = 36.0° Unit: mm | | | | |
|---|---|---|---|---|
| Surface Data | | | | |
| Surface Number i | R | d | Nd | vd |
| (Object) | ∞ | ∞ | | |
| 1* | 21.864(=R1f) | 0.350 | 1.6142 | 26.0 |
| 2* | 3.942 | 0.050 | | |
| 3(Stop) | ∞ | 0.080 | | |
| 4* | 1.167(=R2f) | 0.517 | 1.5247 | 56.2 |
| 5* | 67.224 | 1.000 | | |
| 6* | −0.586 | 0.350 | 1.6142 | 26.0 |
| 7* | −1.384(=R3r) | 0.050 | | |
| 8* | 0.969(=R4f) | 0.940 | 1.5247 | 56.2 |
| 9* | 2.599 | 0.300 | | |
| 10 | ∞ | 0.300 | 1.5163 | 64.1 |
| 11 | ∞ | 1.159 | | |
| (Image plane) | ∞ | | | | f1 = −7.89 mm
f2 = 2.26 mm
f3 = −1.99 mm
f4 = 2.46 mm

Aspheric Surface Data

First Surface k = −1.825E+03, $A_4$ = −9.516E−02, $A_6$ = −2.527E−02, $A_8$ = 8.363E−02, $A_{10}$ = −3.496E−02
Second Surface k = −2.900, $A_4$ = −3.724E−01, $A_6$ = 4.510E−01, $A_8$ = −3.888E−01, $A_{10}$ = 2.004E−01

-continued $$f = 3.86 \text{ mm, Fno} = 2.9, \omega = 36.0°$$
Unit: mm

Fourth Surface $k = -6.839, A_4 = 2.518E-01, A_6 = -3.070E-01, A_8 = 4.098E-01,$
$A_{10} = -1.907E-01$
Fifth Surface $k = -4.543E+01, A_4 = 4.704E-02, A_6 = -4.397E-02, A_8 = -9.463E-02,$
$A_{10} = 1.185E-01$
Sixth Surface $k = -3.217, A_4 = -3.410E-01, A_6 = 5.147E-02, A_8 = 7.612E-02,$
$A_{10} = -1.547E-01, A_{12} = 3.503E-02, A_{14} = 1.026E-01,$
$A_{16} = -2.710E-01$
Seventh Surface $k = -2.938E-01, A_4 = 2.002E-05, A_6 = 4.525E-02, A_8 = 4.123E-02,$
$A_{10} = -1.059E-02$
Eighth Surface $k = -7.580, A_4 = -2.171E-02, A_6 = -2.674E-03, A_8 = 3.063E-03,$
$A_{10} = -4.321E-04, A_{12} = -4.584E-05, A_{14} = 7.107E-06,$
$A_{16} = 1.472E-07$
Ninth Surface $k = -7.795, A_4 = -3.459E-02, A_6 = 5.139E-03, A_8 = -2.142E-03,$
$A_{10} = 4.452E-04, A_{12} = -1.347E-06, A_{14} = -6.215E-06,$
$A_{16} = -1.097E-07$ The values of the respective conditional expressions are as follows:

$f2/f1 = -0.29$ $f/R1f = 0.18$ $R2f/f = 0.30$ $f2/f4 = 0.92$ $|f3/f4| = 0.81$ $R3r/R4f = -1.43$

Accordingly, the imaging lens of Numerical Data Example 1 satisfies the above-described conditional expressions. A distance on the optical axis X from the object-side surface of the first lens L1 to the image plane IM (length in air) is 4.99 mm, and miniaturization of the imaging lens is attained.

Figure 2:
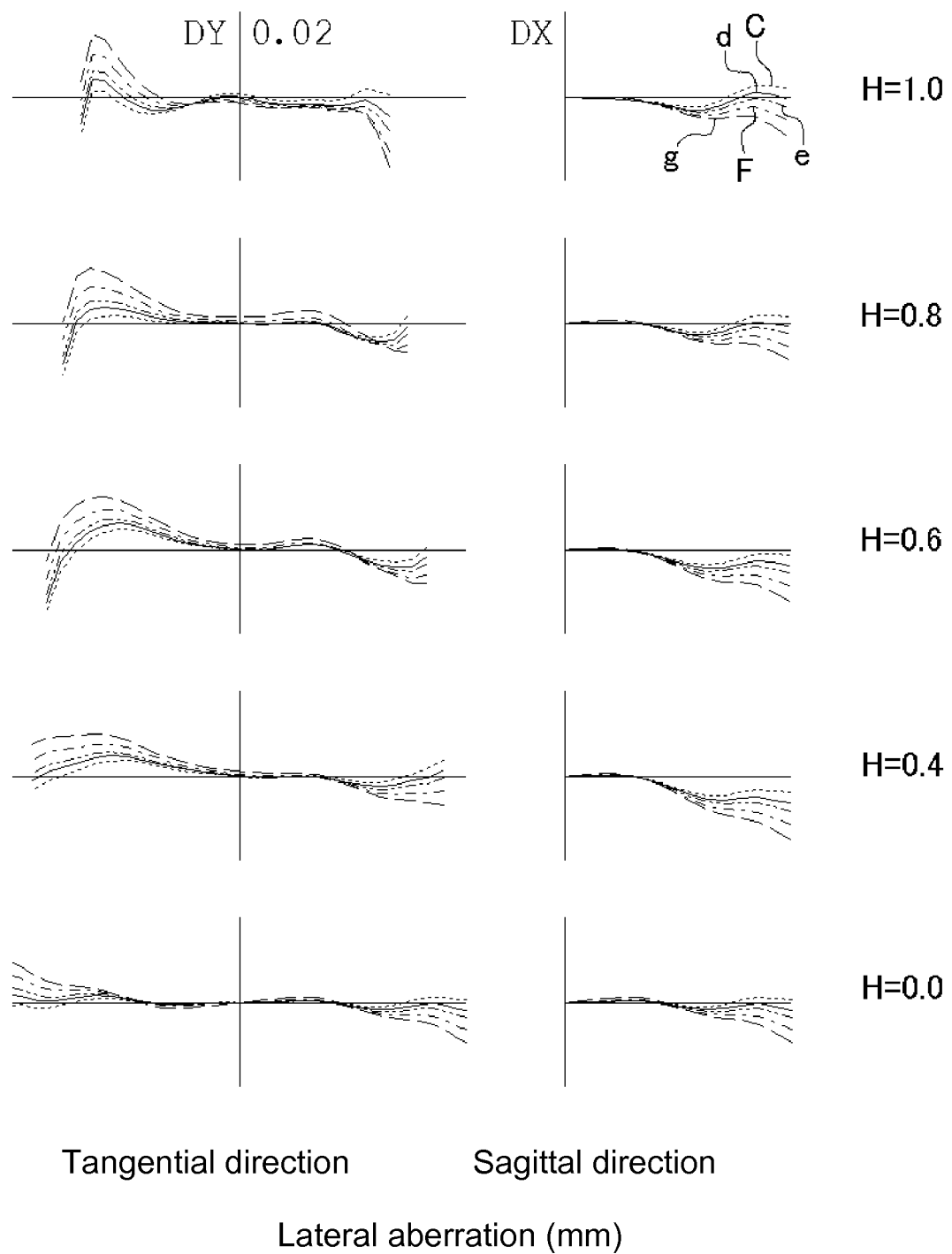
FIG. 2 is an aberration diagram showing a lateral aberration of the imaging lens of FIG. 1.
Figure 3:
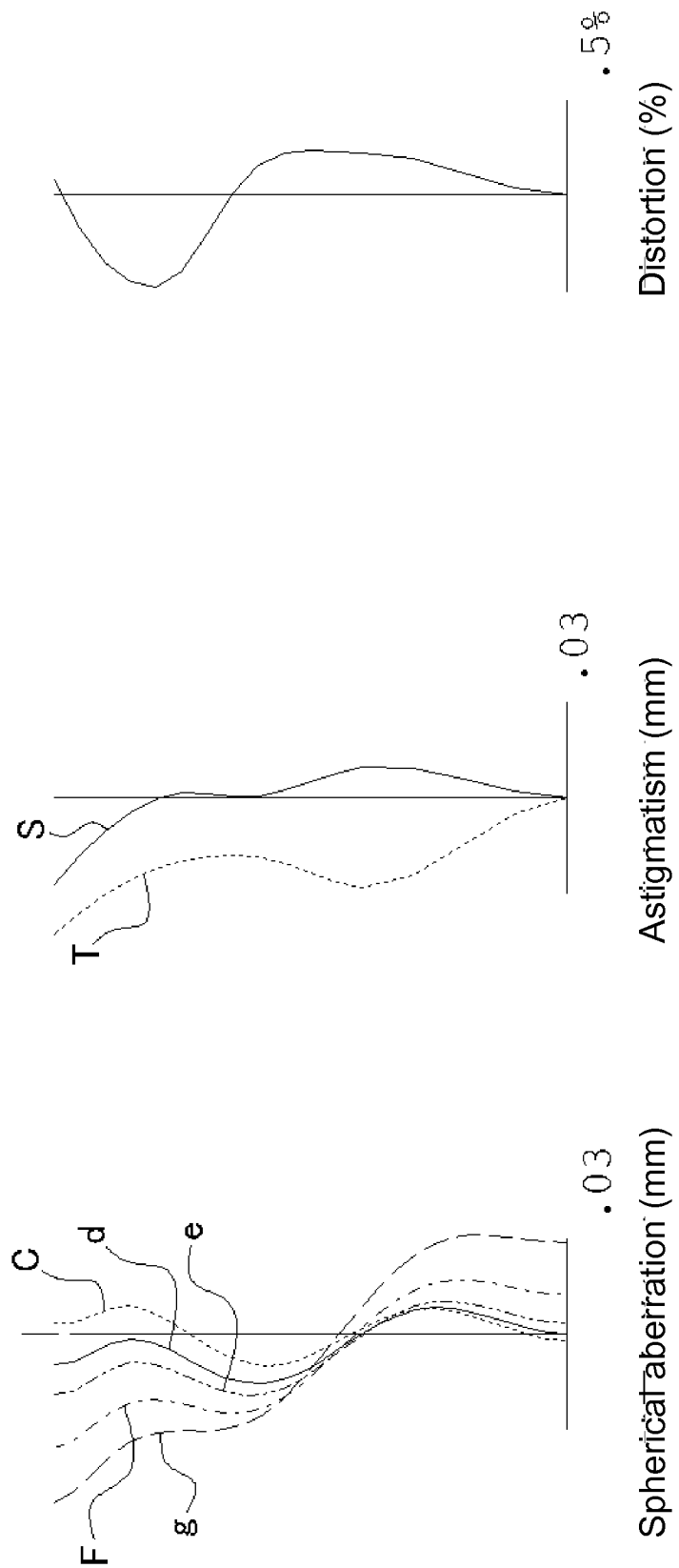
FIG. 3 is an aberration diagram showing a spherical aberration, an astigmatism, and a distortion of the imaging lens of FIG. 1.
Figure 4:
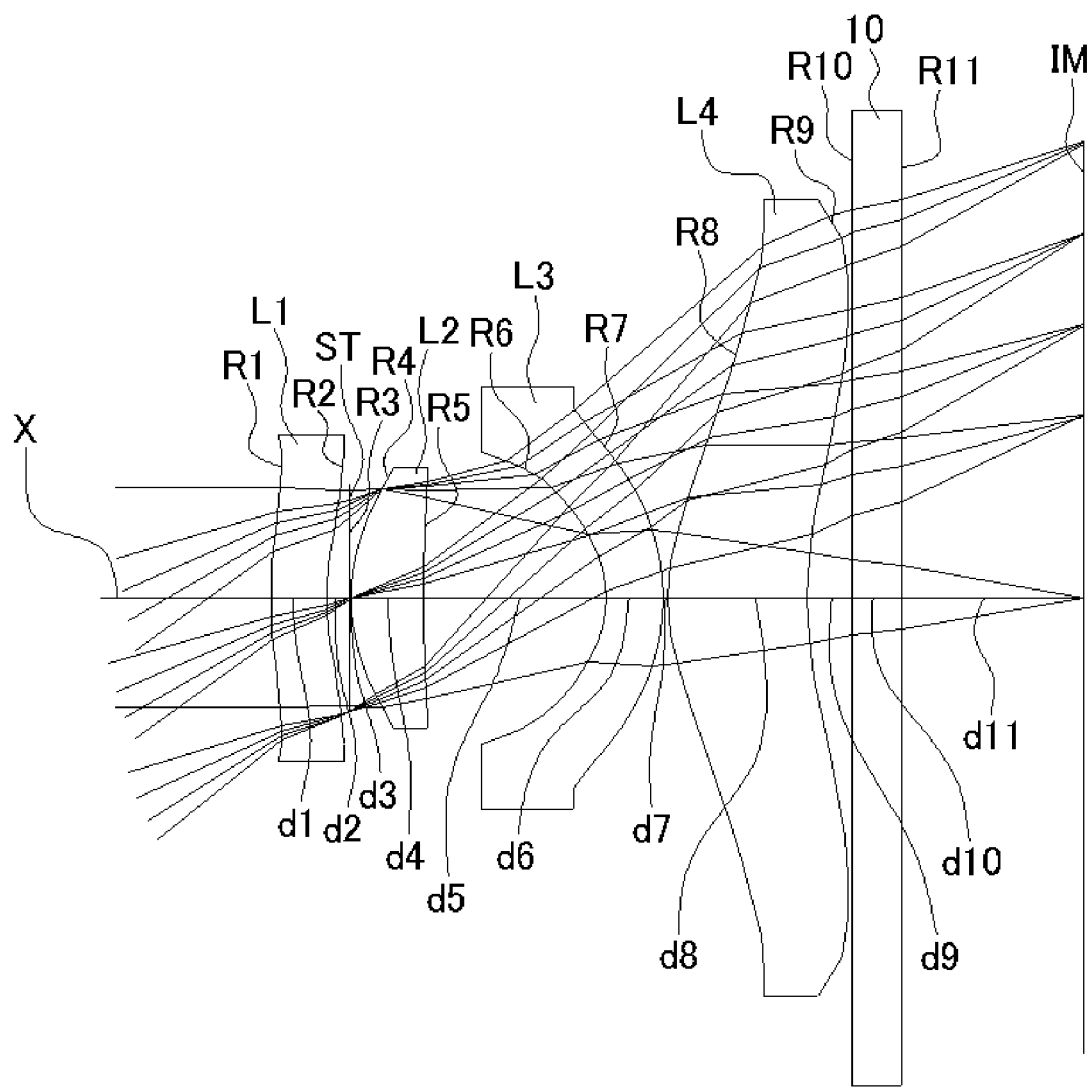
FIG. 4 shows an illustrative sectional view of a configuration of an imaging lens in Numerical Data Example 2 according to the embodiment of the invention.

FIG. 2 shows a lateral aberration that corresponds to a ratio H of each image height to the maximum image height (hereinafter referred to as "image height ratio H"), which is divided into a tangential direction and a sagittal direction in the imaging lens of Numerical Data Example 1 (which is the same in FIGS. 5, 8, 11, and 14). Furthermore, FIG. 3 shows a spherical aberration (mm), an astigmatism (mm), and a distortion (%) of the imaging lens of Numerical Data Example 1, respectively. In the aberration diagrams, for the lateral aberration diagrams and spherical aberration diagrams, aberrations at each wavelength, i.e. a g line (435.84 nm), an F line (486.13 nm), an e line (546.07 nm), a d line (587.56 nm), and a C line (656.27 nm) are indicated. In the astigmatism diagram, an aberration on a sagittal image surface S and an aberration on a tangential image surface T are respectively indicated (which are the same in FIGS. 6, 9, 12, and 15). As shown in FIGS. 2 and 3, according to the imaging lens of Numerical Data Example 1, the aberrations are satisfactorily corrected.

Numerical Data Example 2

Basic data are shown below.

$$f = 3.89 \text{ mm, Fno} = 2.9, \omega = 35.8°$$
Unit: mm

Surface Data

| Surface Number i | R | d | Nd | νd |
|---|---|---|---|---|
| (Object) | ∞ | ∞ | | |
| 1* | 2.598(=R1f) | 0.340 | 1.5850 | 29.0 |
| 2* | 1.493 | 0.140 | | |
| 3(Stop) | ∞ | 0.010 | | |
| 4* | 1.114(=R2f) | 0.450 | 1.5247 | 56.2 |
| 5* | 24.224 | 1.125 | | |
| 6* | −0.598 | 0.350 | 1.5850 | 29.0 |
| 7* | −1.209(=R3r) | 0.020 | | |
| 8* | 1.048(=R4f) | 0.860 | 1.5247 | 56.2 |
| 9* | 2.346 | 0.280 | | |
| 10 | ∞ | 0.300 | 1.5163 | 64.1 |
| 11 | ∞ | 1.116 | | |
| (Image plane) | ∞ | | | |

$f1 = -6.77$ mm
$f2 = 2.21$ mm
$f3 = -2.57$ mm
$f4 = 2.94$ mm

Aspheric Surface Data

First Surface $k = 7.229E-01, A_4 = -1.843E-01, A_6 = 5.665E-02, A_8 = 1.980E-02,$
$A_{10} = -1.300E-01, A_{12} = 2.131E-02, A_{14} = 2.400E-01,$
$A_{16} = -1.804E-01$
Second Surface $k = -8.523, A_4 = -1.139E-01, A_6 = -1.614E-01, A_8 = 1.731E-01,$
$A_{10} = 2.436E-01, A_{12} = -1.492E-01, A_{14} = -9.290E-01,$
$A_{16} = 9.487E-01$
Fourth Surface $k = -3.150, A_4 = 1.026E-01, A_6 = -7.461E-03, A_8 = -7.196E-02,$
$A_{10} = 8.727E-02, A_{12} = 8.993E-02, A_{14} = -5.004E-02,$
$A_{16} = -4.095E-01$
Fifth Surface $k = -3.177E+03, A_4 = 9.059E-02, A_6 = -5.682E-03, A_8 = -2.171E-02,$
$A_{10} = -2.385E-01, A_{12} = 1.271E-04, A_{14} = 2.996E-01,$
$A_{16} = -2.937E-01$
Sixth Surface $k = -3.005, A_4 = -2.150E-01, A_6 = -2.473E-01, A_8 = -1.066E-01,$
$A_{10} = 4.960E-02, A_{12} = 1.173E-01, A_{14} = -3.862E-02,$
$A_{16} = -4.574E-01$
Seventh Surface $k = -3.065, A_4 = -7.001E-02, A_6 = -4.586E-02, A_8 = -3.139E-03,$
$A_{10} = 1.211E-02, A_{12} = 8.984E-03, A_{14} = 3.268E-03,$
$A_{16} = -1.849E-03$
Eighth Surface $k = -7.241, A_4 = -5.166E-03, A_6 = -1.886E-03, A_8 = 3.678E-04,$
$A_{10} = 8.219E-05, A_{12} = -3.132E-06, A_{14} = -4.627E-06,$
$A_{16} = 3.669E-07$
Ninth Surface $k = -1.099E+01, A_4 = -1.009E-02, A_6 = -9.874E-04, A_8 = 5.960E-05,$
$A_{10} = 1.283E-05, A_{12} = 2.616E-06, A_{14} = 6.416E-07,$
$A_{16} = -2.415E-07$ The values of the respective conditional expressions are as follows:

$f2/f1 = -0.33$ $f/R1f = 1.50$ $R2f/f=0.29$ $f2/f4=0.75$ $|f3/f4|=0.87$ $R3r/R4f=-1.15$

Accordingly, the imaging lens of Numerical Data Example 2 satisfies the above-described conditional expressions. A distance on the optical axis X from the object-side surface of the first lens L1 to the image plane IM (length in air) is 4.89 mm, and miniaturization of the imaging lens is attained.

Figure 5:
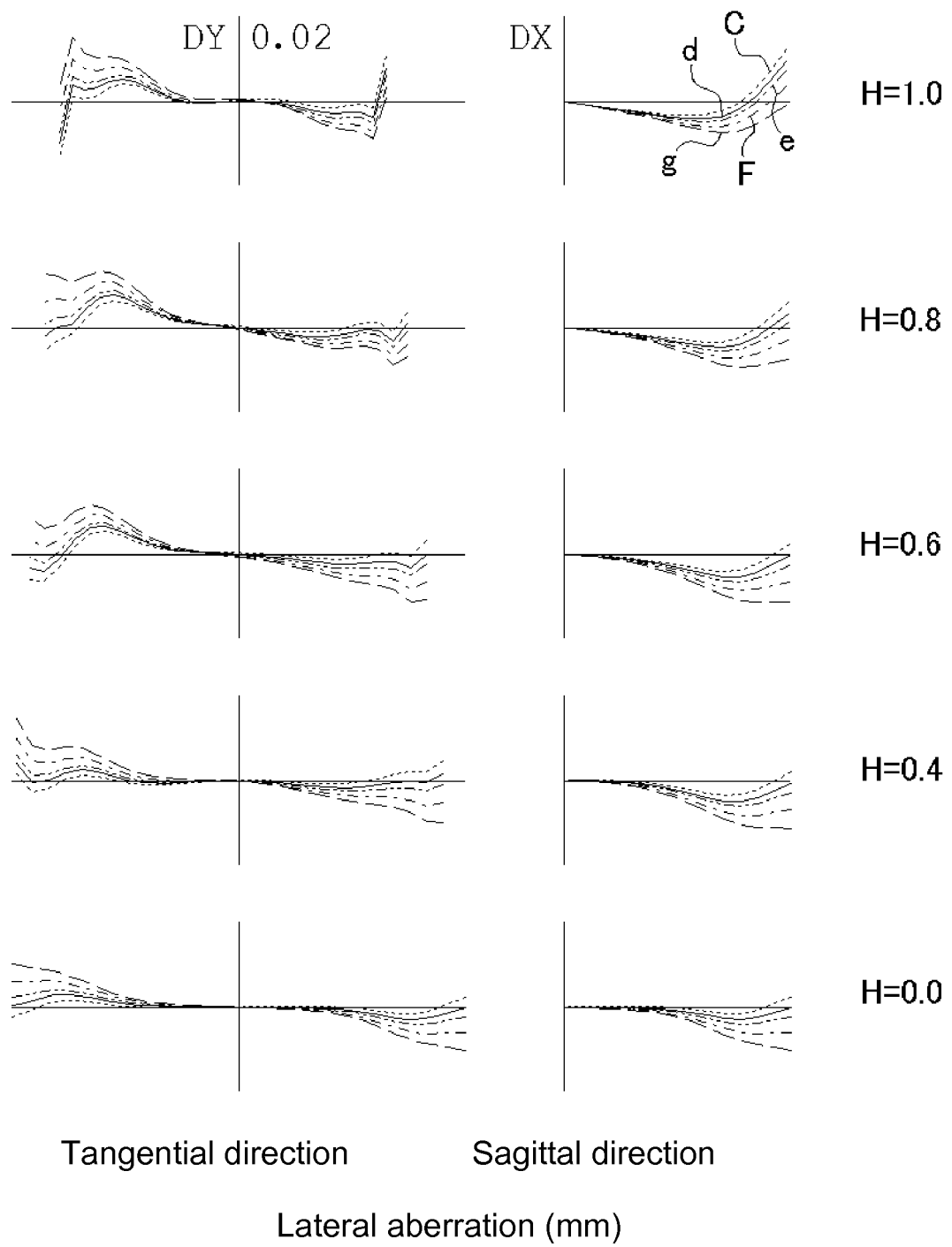
FIG. 5 is an aberration diagram showing a lateral aberration of the imaging lens of FIG. 4.
Figure 6:
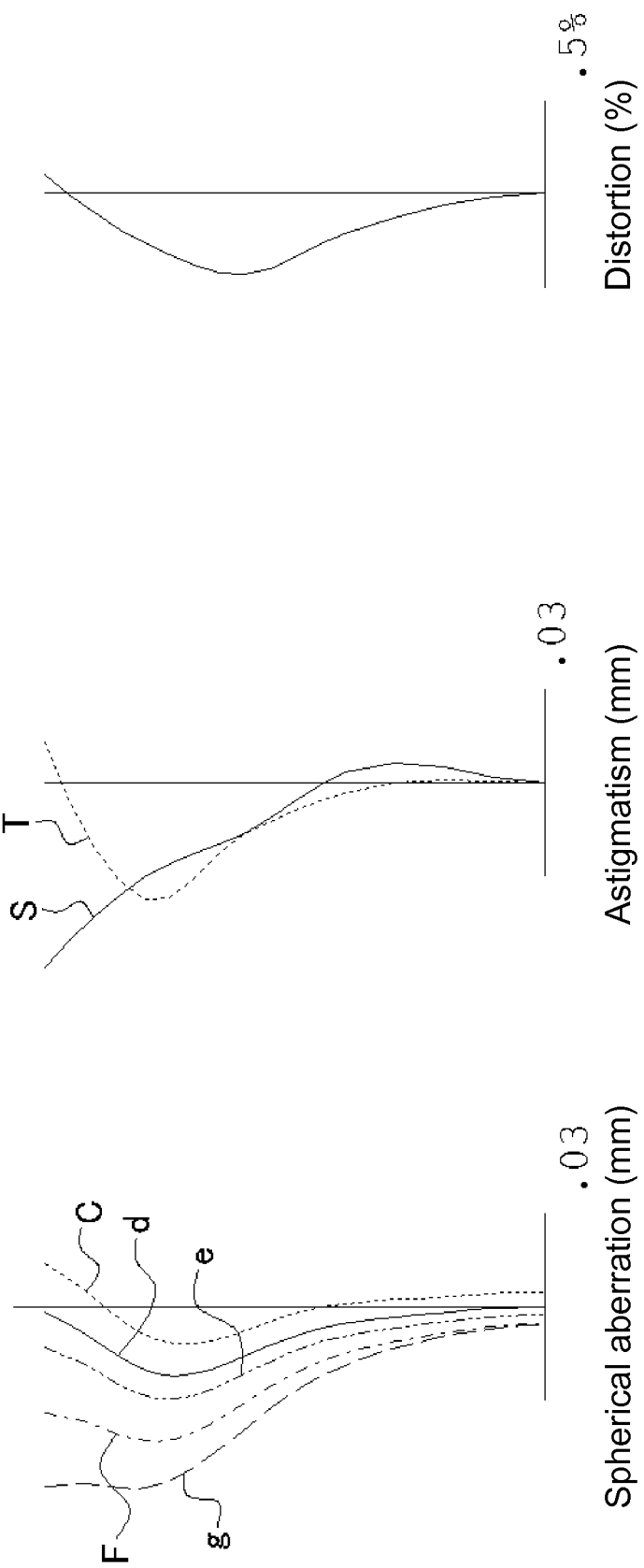
FIG. 6 is an aberration diagram showing a spherical aberration, an astigmatism, and a distortion of the imaging lens of FIG. 4.
Figure 7:
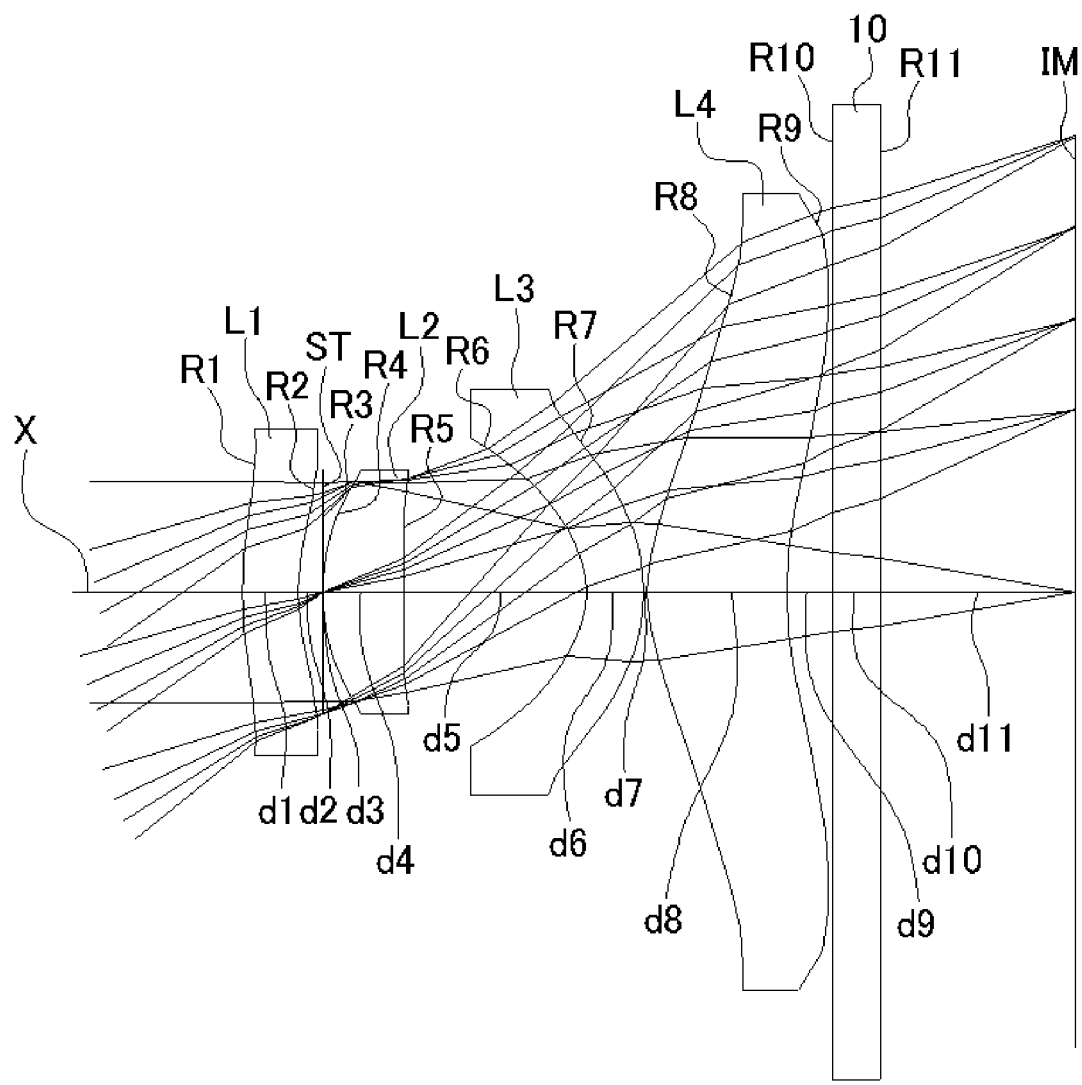
FIG. 7 shows an illustrative sectional view of a configuration of an imaging lens in Numerical Data Example 3 according to the embodiment of the invention.

FIG. 5 shows the lateral aberration that corresponds to the image height ratio H of the imaging lens of Numerical Data Example 2. FIG. 6 shows a spherical aberration (mm), an astigmatism (mm), and a distortion (%), respectively, in the imaging lens of Numerical Data Example 2. As shown in FIGS. 5 and 6, according to the imaging lens of Numerical Data Example 2, the aberrations are satisfactorily corrected.

Numerical Data Example 3

Basic data are shown below.

| f = 3.93 mm, Fno = 2.9, ω = 35.6° Unit: mm | | | | |
|---|---|---|---|---|
| Surface Data | | | | |
| Surface Number i | R | d | Nd | vd |
| (Object) | ∞ | ∞ | | |
| 1* | 2.311(=R1f) | 0.340 | 1.6142 | 26.0 |
| 2* | 1.394 | 0.150 | | |
| 3(Stop) | ∞ | 0.000 | | |
| 4* | 1.171(=R2f) | 0.500 | 1.5247 | 56.2 |
| 5* | −448.146 | 1.125 | | |
| 6* | −0.564 | 0.350 | 1.6142 | 26.0 |
| 7* | −1.077(=R3r) | 0.020 | | |
| 8* | 1.034(=R4f) | 0.860 | 1.5247 | 56.2 |
| 9* | 2.279 | 0.280 | | |
| 10 | ∞ | 0.300 | 1.5163 | 64.1 |
| 11 | ∞ | 1.190 | | |
| (Image plane) | ∞ | | | |
| f1 = −6.66 mm | | | | |
| f2 = 2.23 mm | | | | |
| f3 = −2.60 mm | | | | |
| f4 = 2.91 mm | | | | |

Aspheric Surface Data

First Surface $k = 4.980E-01, A_4 = -1.797E-01, A_6 = 1.277E-02, A_8 = 5.926E-02,$
$A_{10} = -1.094E-01, A_{12} = -8.485E-03, A_{14} = 1.904E-01,$
$A_{16} = -1.239E-01$
Second Surface $k = -6.792, A_4 = -7.812E-02, A_6 = -1.932E-01, A_8 = 9.959E-02,$
$A_{10} = 2.974E-01, A_{12} = 4.604E-02, A_{14} = -7.646E-01,$
$A_{16} = 4.631E-01$
Fourth Surface $k = -3.150, A_4 = 1.061E-01, A_6 = -1.101E-02, A_8 = 3.822E-02,$
$A_{10} = 6.795E-02, A_{12} = -8.034E-02, A_{14} = -3.957E-02,$
$A_{16} = 4.689E-01$
Fifth Surface $k = -3.177E+03, A_4 = 5.913E-02, A_6 = 9.353E-02, A_8 = 2.253E-02,$
$A_{10} = -1.251E-01, A_{12} = -7.006E-02, A_{14} = -7.831E-02,$
$A_{16} = 9.236E-01$ -continued

| f = 3.93 mm, Fno = 2.9, ω = 35.6° Unit: mm |
|---|
| Sixth Surface |

$k = -3.005, A_4 = -3.025E-01, A_6 = -9.499E-02, A_8 = 1.924E-02,$
$A_{10} = 4.319E-02, A_{12} = -3.088E-04, A_{14} = -3.308E-02,$
$A_{16} = 6.897E-02$
Seventh Surface $k = -3.065, A_4 = -1.119E-01, A_6 = -2.037E-02, A_8 = 1.041E-02,$
$A_{10} = 1.549E-02, A_{12} = 9.212E-03, A_{14} = 2.063E-03,$
$A_{16} = -3.528E-03$
Eighth Surface $k = -7.241, A_4 = -5.166E-03, A_6 = -1.886E-03, A_8 = 3.678E-04,$
$A_{10} = 8.219E-05, A_{12} = -3.132E-06, A_{14} = -4.627E-06,$
$A_{16} = 3.669E-07$
Ninth Surface $k = -1.099E+01, A_4 = -1.009E-02, A_6 = -9.874E-04, A_8 = 5.960E-05,$
$A_{10} = 1.283E-05, A_{12} = 2.616E-06, A_{14} = 6.416E-07,$
$A_{16} = -2.415E-07$ The values of the respective conditional expressions are as follows:

$f2/f1=-0.33$ $f/R1f=1.70$ $R2f/f=0.30$ $f2/f4=0.77$ $|f3/f4|=0.89$ $R3r/R4f=-1.04$

Accordingly, the imaging lens of Numerical Data Example 3 satisfies the above-described conditional expressions. A distance on the optical axis X from the object-side surface of the first lens L1 to the image plane IM (length in air) is 5.01 mm, and miniaturization of the imaging lens is attained.

Figure 8:
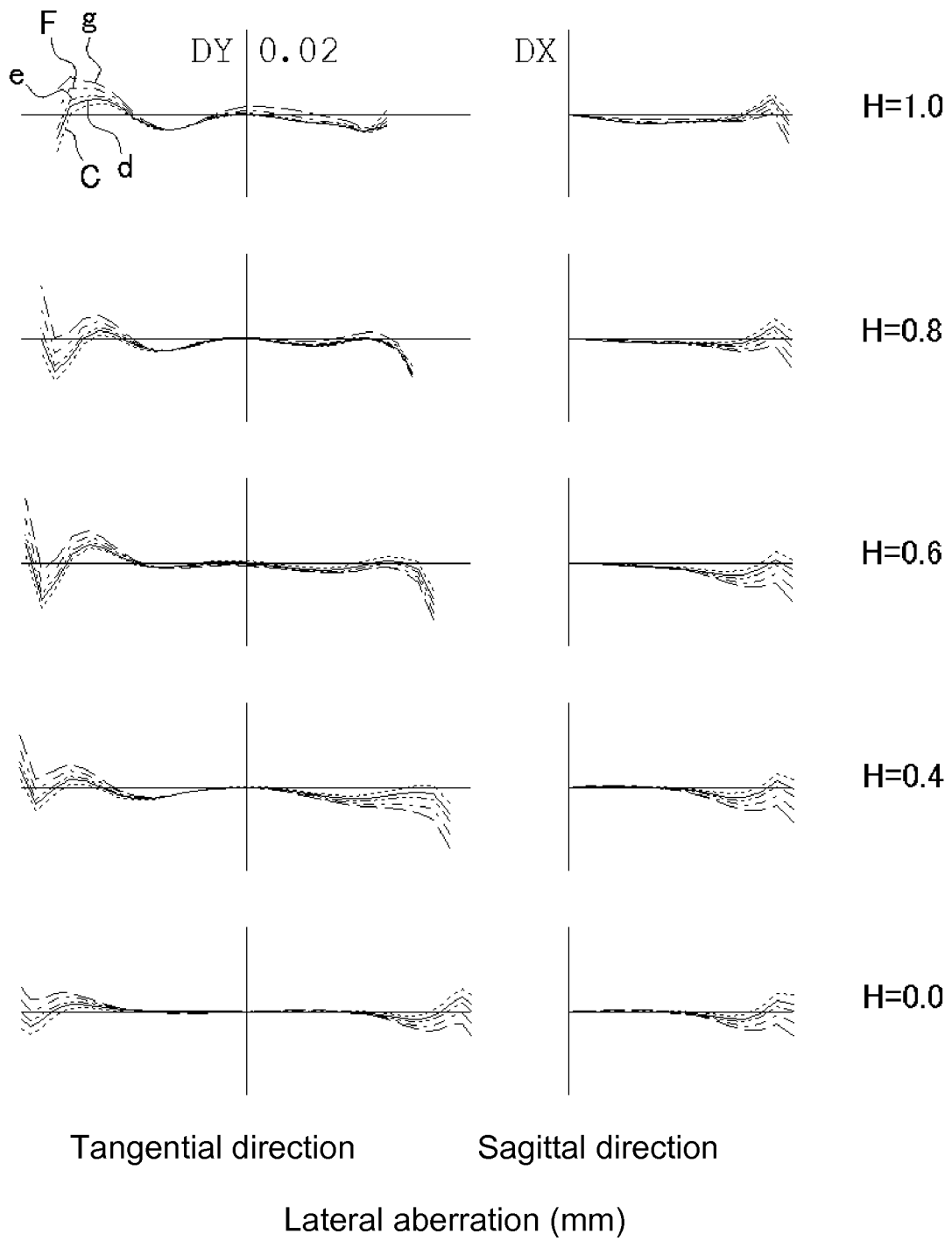
FIG. 8 is an aberration diagram showing a lateral aberration of the imaging lens of FIG. 7.
Figure 9:
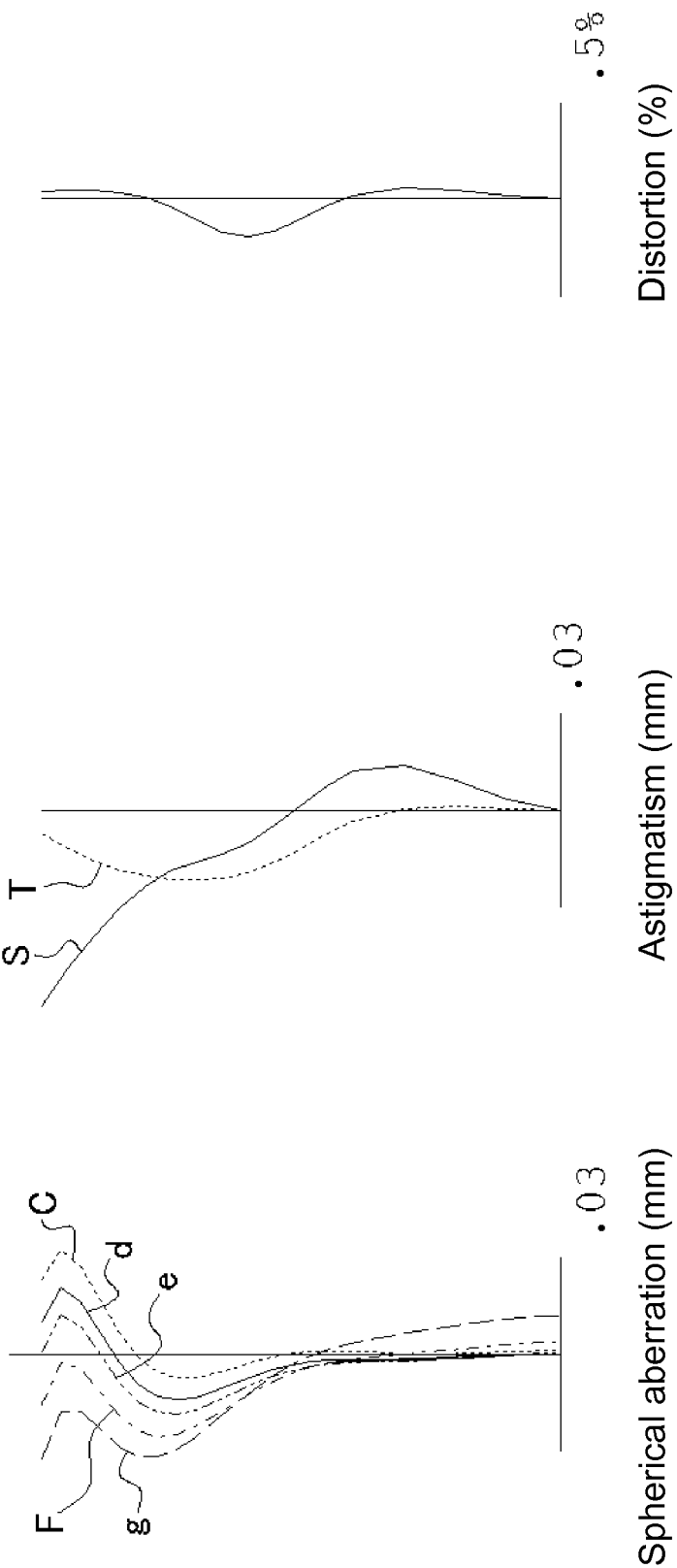
FIG. 9 is an aberration diagram showing a spherical aberration, an astigmatism, and a distortion of the imaging lens of FIG. 7.
Figure 10:
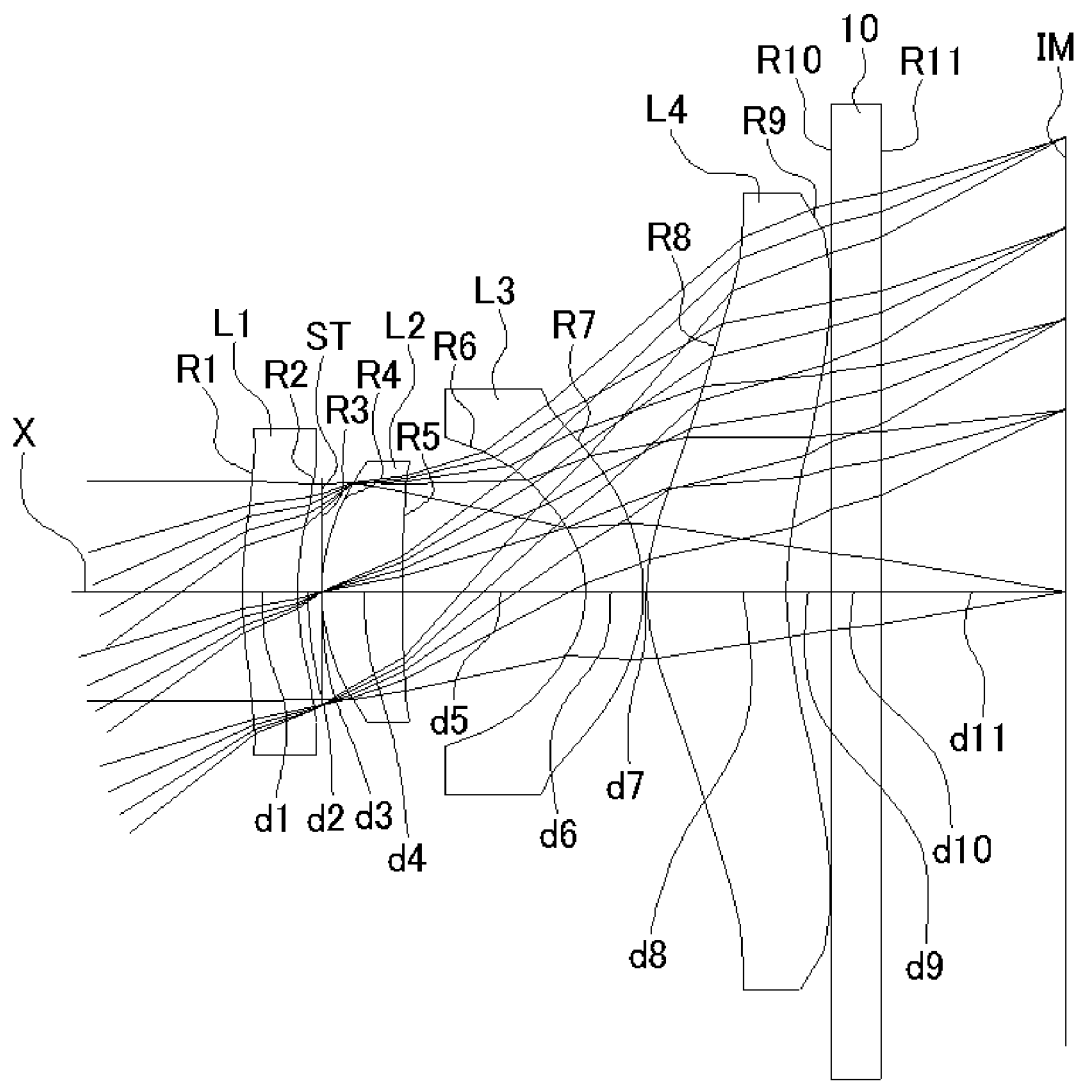
FIG. 10 shows an illustrative sectional view of a configuration of an imaging lens in Numerical Data Example 4 according to the embodiment of the invention.

FIG. 8 shows the lateral aberration that corresponds to the image height ratio H of the imaging lens of Numerical Data Example 3. FIG. 9 shows a spherical aberration (mm), an astigmatism (mm), and a distortion (%), respectively, in the imaging lens of Numerical Data Example 3. As shown in FIGS. 8 and 9, according to the imaging lens of Numerical Data Example 3, the aberrations are satisfactorily corrected.

Numerical Data Example 4

Basic data are shown below.

| f = 3.88 mm, Fno = 2.9, ω = 35.9° Unit: mm | | | | |
|---|---|---|---|---|
| Surface Data | | | | |
| Surface Number i | R | d | Nd | vd |
| (Object) | ∞ | ∞ | | |
| 1* | 2.465(=R1f) | 0.340 | 1.6142 | 26.0 |
| 2* | 1.448 | 0.150 | | |
| 3(Stop) | ∞ | 0.000 | | |
| 4* | 1.135(=R2f) | 0.500 | 1.5247 | 56.2 |
| 5* | 40.467 | 1.125 | | |
| 6* | −0.569 | 0.350 | 1.6142 | 26.0 |
| 7* | −1.093(=R3r) | 0.020 | | |

-continued f = 3.88 mm, Fno = 2.9, ω = 35.9°
Unit: mm

| | | | | |
|---|---|---|---|---|
| 8* | 1.005(=R4f) | 0.860 | 1.5247 | 56.2 |
| 9* | 2.140 | 0.280 | | |
| 10 | ∞ | 0.300 | 1.5163 | 64.1 |
| 11 | ∞ | 1.141 | | |
| (Image plane) | ∞ | | | | f1 = −6.55 mm
f2 = 2.22 mm
f3 = −2.59 mm
f4 = 2.86 mm

Aspheric Surface Data

First Surface k = 9.922E−01, $A_4$ = −1.742E−01, $A_6$ = 2.709E−02, $A_8$ = 5.347E−02,
$A_{10}$ = −1.171E−01, $A_{12}$ = −5.845E−03, $A_{14}$ = 1.993E−01,
$A_{16}$ = −1.377E−01
Second Surface k = −7.709, $A_4$ = −7.554E−02, $A_6$ = −1.682E−01, $A_8$ = 1.200E−01,
$A_{10}$ = 2.797E−01, $A_{12}$ = −8.835E−03, $A_{14}$ = −8.252E−01,
$A_{16}$ = 4.638E−01
Fourth Surface k = −3.150, $A_4$ = 1.163E−01, $A_6$ = −2.665E−02, $A_8$ = 3.458E−02,
$A_{10}$ = 8.884E−02, $A_{12}$ = −8.052E−02, $A_{14}$ = −1.414E−01,
$A_{16}$ = 2.690E−01
Fifth Surface k = −3.177E+03, $A_4$ = 7.084E−02, $A_6$ = 5.404E−02, $A_8$ = −2.260E−02,
$A_{10}$ = −1.236E−01, $A_{12}$ = 3.306E−02, $A_{14}$ = 7.744E−03,
$A_{16}$ = 2.109E−01
Sixth Surface k = −3.005, $A_4$ = −2.372E−01, $A_6$ = −2.654E−01, $A_8$ = 1.618E−02,
$A_{10}$ = 8.959E−02, $A_{12}$ = −2.184E−02, $A_{14}$ = −1.415E−01,
$A_{16}$ = −4.499E−02
Seventh Surface k = −3.065, $A_4$ = −1.049E−01, $A_6$ = −2.780E−02, $A_8$ = −5.889E−03,
$A_{10}$ = 9.940E−03, $A_{12}$ = 1.075E−02, $A_{14}$ = 4.766E−03,
$A_{16}$ = −2.564E−03
Eighth Surface k = −7.241, $A_4$ = −5.166E−03, $A_6$ = −1.886E−03, $A_8$ = 3.678E−04,
$A_{10}$ = 8.219E−05, $A_{12}$ = −3.132E−06, $A_{14}$ = −4.627E−06,
$A_{16}$ = 3.669E−07
Ninth Surface k = −1.099E+01, $A_4$ = −1.009E−02, $A_6$ = −9.874E−04, $A_8$ = 5.960E−05,
$A_{10}$ = 1.283E−05, $A_{12}$ = 2.616E−06, $A_{14}$ = 6.416E−07,
$A_{16}$ = −2.415E−07

The values of the respective conditional expressions are as follows:

$f2/f1 = -0.34$ $f/R1f = 1.57$ $R2f/f = 0.29$ $f2/f4 = 0.78$ $|f3/f4| = 0.91$ $R3r/R4f = -1.09$

Accordingly, the imaging lens of Numerical Data Example 4 satisfies the above-described conditional expressions. A distance on the optical axis X from the object-side surface of the first lens L1 to the image plane IM (length in air) is 4.96 mm, and miniaturization of the imaging lens is attained.

Figure 11:
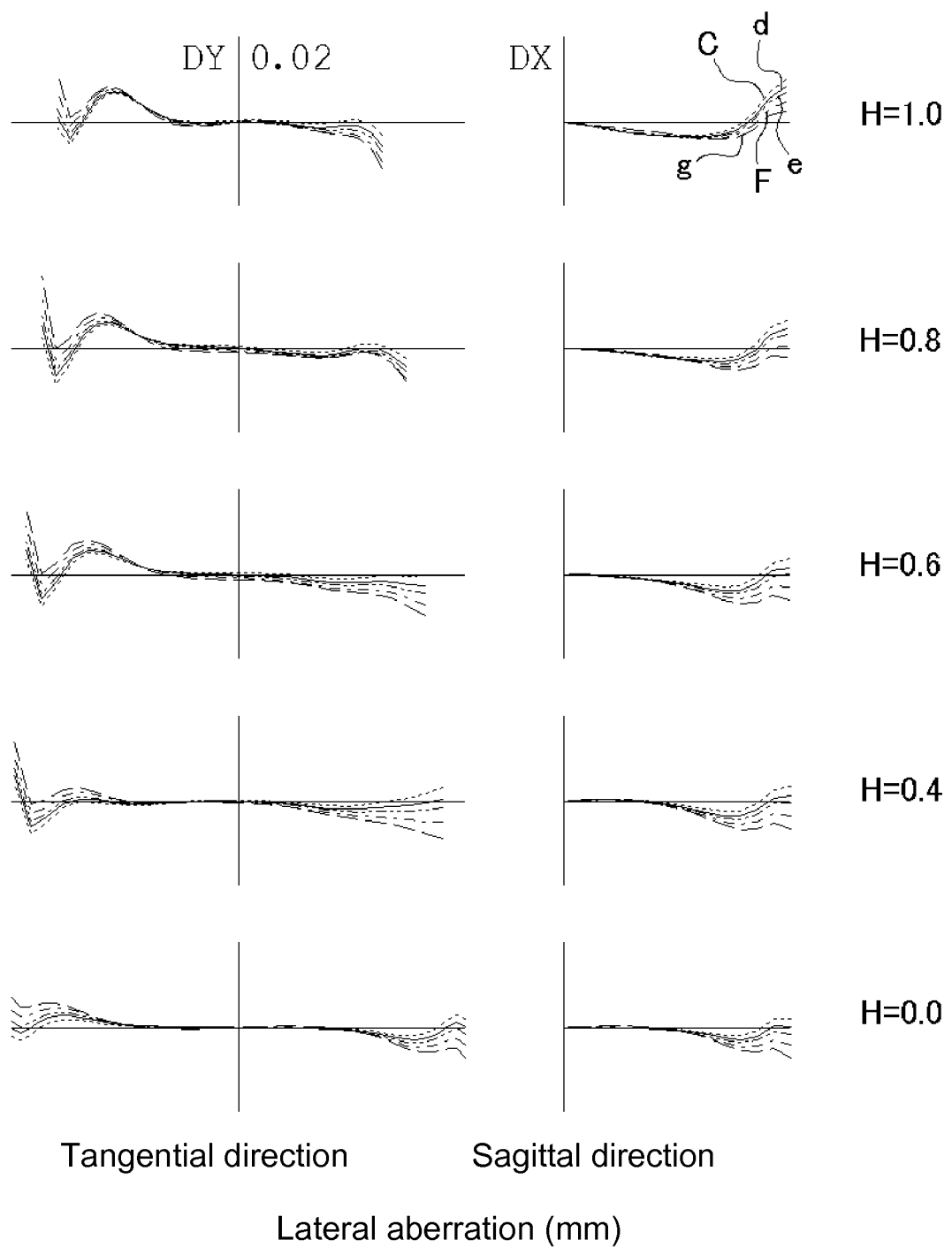
FIG. 11 is an aberration diagram showing a lateral aberration of the imaging lens of FIG. 10.
Figure 12:
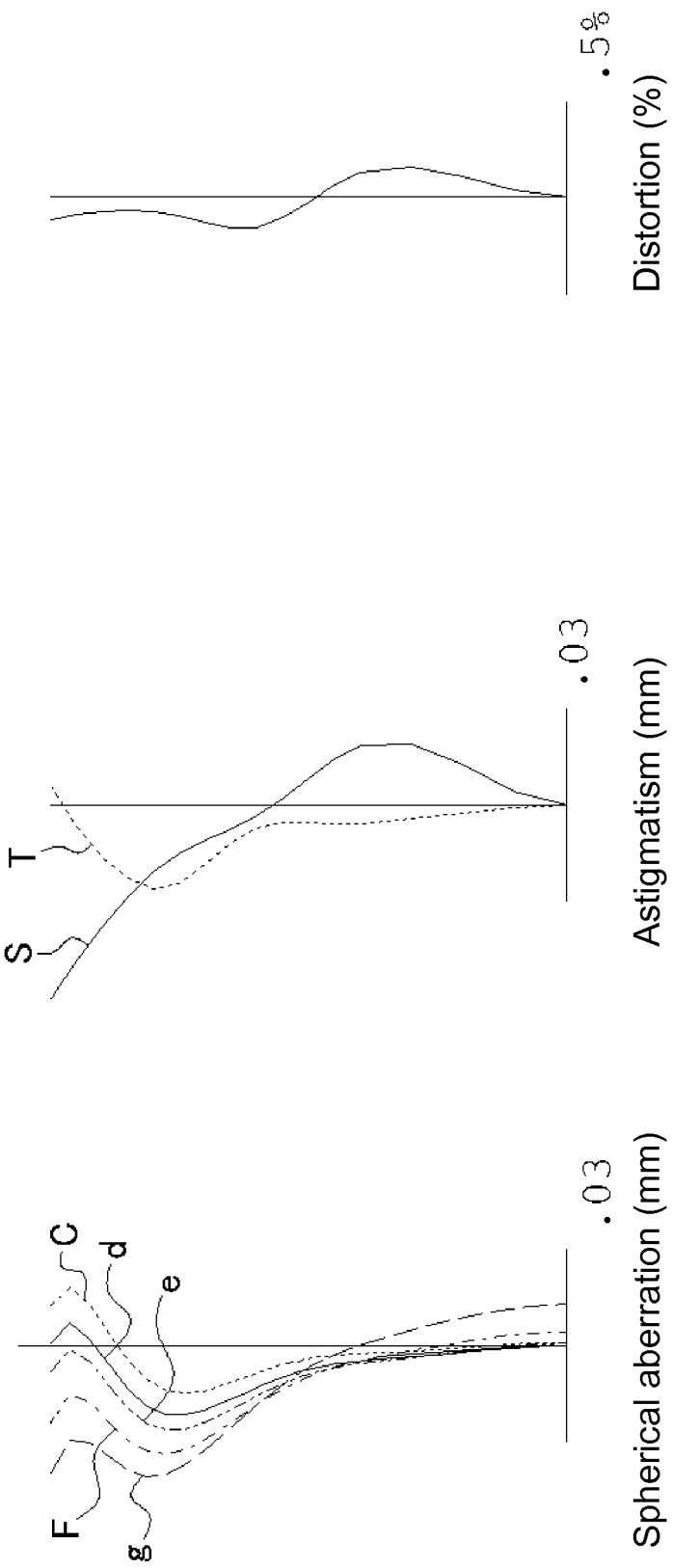
FIG. 12 is an aberration diagram showing a spherical aberration, an astigmatism, and a distortion of the imaging lens of FIG. 10.
Figure 13:
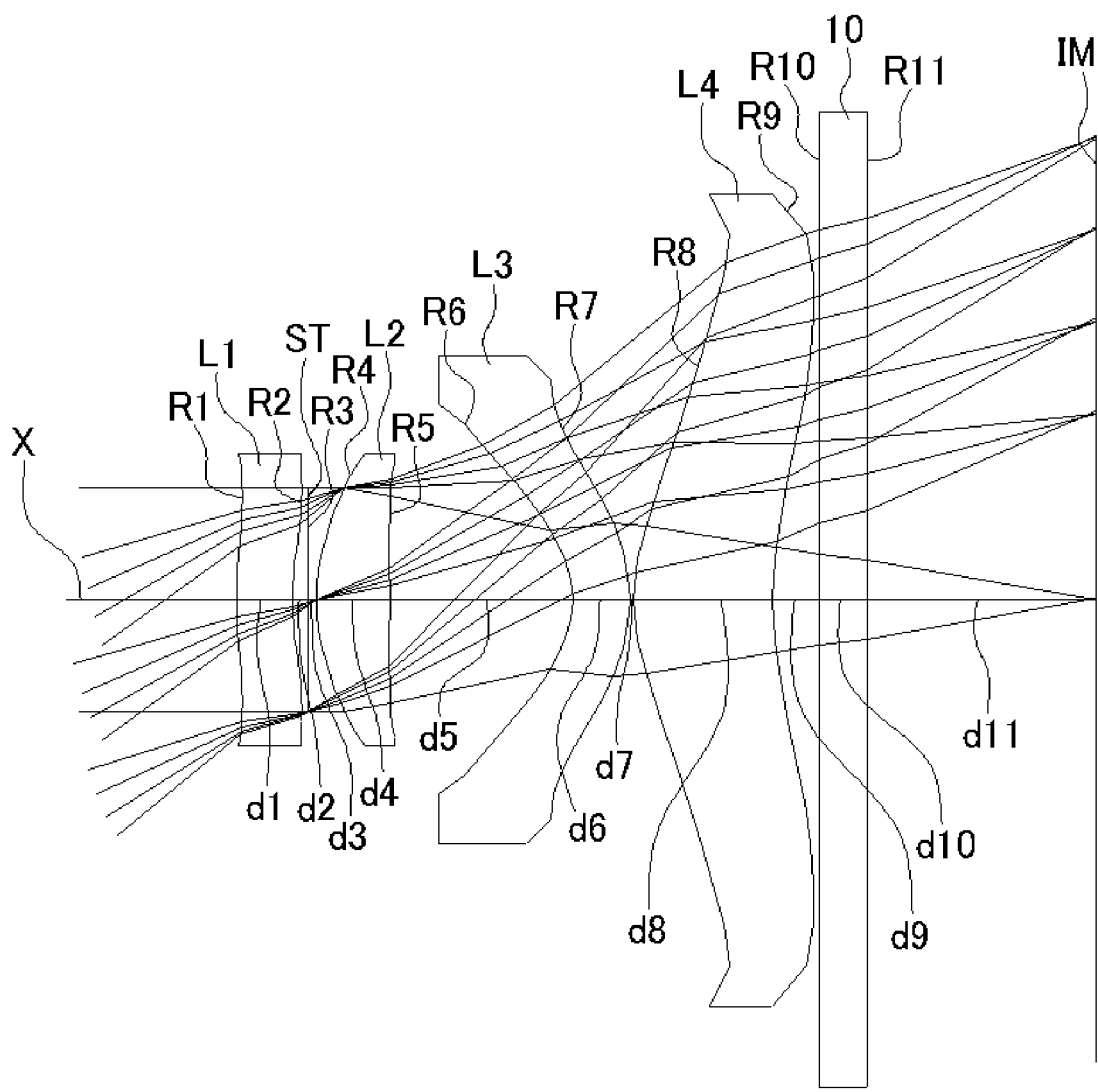
FIG. 13 shows an illustrative sectional view of a configuration of an imaging lens in Numerical Data Example 5 according to the embodiment of the invention.

FIG. 11 shows the lateral aberration that corresponds to the image height ratio H of the imaging lens of Numerical Data Example 4. FIG. 12 shows a spherical aberration (mm), an astigmatism (mm), and a distortion (%), respectively, in the imaging lens of Numerical Data Example 4. As shown in FIGS. 11 and 12, according to the imaging lens of Numerical Data Example 4, the aberrations are satisfactorily corrected.

Numerical Data Example 5

Basic data are shown below.

f = 3.93 mm, Fno = 2.9, ω = 36.0°
Unit: mm

Surface Data

| Surface Number i | R | d | Nd | vd |
|---|---|---|---|---|
| (Object) | ∞ | ∞ | | |
| 1* | 3.266(=R1f) | 0.340 | 1.6142 | 26.0 |
| 2* | 1.692 | 0.100 | | |
| 3(Stop) | ∞ | 0.050 | | |
| 4* | 1.265(=R2f) | 0.450 | 1.5247 | 56.2 |
| 5* | −15.176 | 1.125 | | |
| 6* | −0.546 | 0.350 | 1.6142 | 26.0 |
| 7* | −1.014(=R3r) | 0.020 | | |
| 8* | 1.057(=R4f) | 0.860 | 1.5247 | 56.2 |
| 9* | 2.393 | 0.280 | | |
| 10 | ∞ | 0.300 | 1.5163 | 64.1 |
| 11 | ∞ | 1.403 | | |
| (Image plane) | ∞ | | | | f1 = −6.23 mm
f2 = 2.25 mm
f3 = −2.69 mm
f4 = 2.95 mm

Aspheric Surface Data

First Surface k = 0.000, $A_4$ = −1.936E−01, $A_6$ = 4.980E−03, $A_8$ = 6.270E−02,
$A_{10}$ = −9.322E−02, $A_{12}$ = 1.485E−03, $A_{14}$ = 1.773E−01,
$A_{16}$ = −1.650E−01
Second Surface k = −1.355E+01, $A_4$ = −1.281E−01, $A_6$ = −2.378E−01, $A_8$ = 1.123E−01,
$A_{10}$ = 3.530E−01, $A_{12}$ = 6.343E−02, $A_{14}$ = −8.706E−01,
$A_{16}$ = 3.776E−01
Fourth Surface k = −3.150, $A_4$ = 3.911E−02, $A_6$ = −3.177E−02, $A_8$ = −9.195E−03,
$A_{10}$ = 6.068E−02, $A_{12}$ = 6.148E−03, $A_{14}$ = 4.211E−02,
$A_{16}$ = 1.102E−03
Fifth Surface k = −3.177E+03, $A_4$ = 6.514E−02, $A_6$ = 3.131E−02, $A_8$ = 1.066E−02,
$A_{10}$ = −1.007E−01, $A_{12}$ = 8.310E−03, $A_{14}$ = −1.264E−02,
$A_{16}$ = 2.171E−01
Sixth Surface k = −3.005, $A_4$ = −2.496E−01, $A_6$ = 1.038E−01, $A_8$ = 4.788E−02,
$A_{10}$ = −1.152E−02, $A_{12}$ = 1.523E−03, $A_{14}$ = 1.346E−02,
$A_{16}$ = −1.747E−02
Seventh Surface k = −3.065, $A_4$ = −8.891E−02, $A_6$ = 2.755E−02, $A_8$ = 2.755E−02,
$A_{10}$ = 8.117E−03, $A_{12}$ = −2.539E−03, $A_{14}$ = −2.846E−03,
$A_{16}$ = 2.330E−04
Eighth Surface k = −7.241, $A_4$ = −5.166E−03, $A_6$ = −1.886E−03, $A_8$ = 3.678E−04,
$A_{10}$ = 8.219E−05, $A_{12}$ = −3.132E−06, $A_{14}$ = −4.627E−06,
$A_{16}$ = 3.669E−07

-continued f = 3.93 mm, Fno = 2.9, ω = 36.0°
Unit: mm

Ninth Surface k = −1.099E+01, $A_4$ = −1.009E−02, $A_6$ = −9.874E−04, $A_8$ = 5.960E−05, $A_{10}$ = 1.283E−05, $A_{12}$ = 2.616E−06, $A_{14}$ = 6.416E−07, $A_{16}$ = −2.415E−07

The values of the respective conditional expressions are as follows:

$f2/f1$=−0.36

$f/R1f$=1.20

$R2f/f$=0.32

$f2/f4$=0.76

$|f3/f4|$=0.91

$R3r/R4f$=−0.96

Accordingly, the imaging lens of Numerical Data Example 5 satisfies the above-described conditional expressions. A distance on the optical axis X from the object-side surface of the first lens L1 to the image plane IM (length in air) is 5.18 mm, and miniaturization of the imaging lens is attained.

Figure 14:
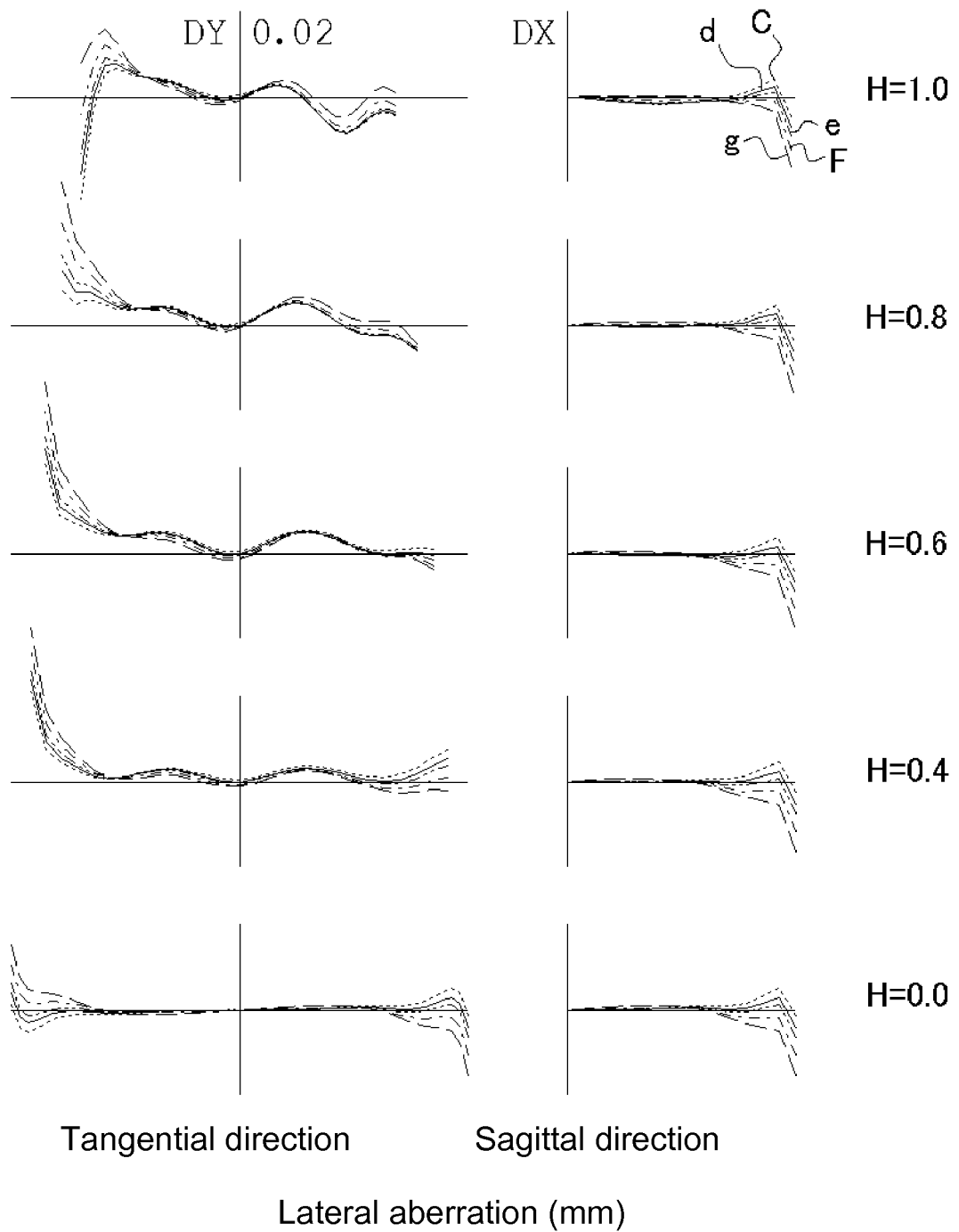
FIG. 14 is an aberration diagram showing a lateral aberration of the imaging lens of FIG. 13.
Figure 15:
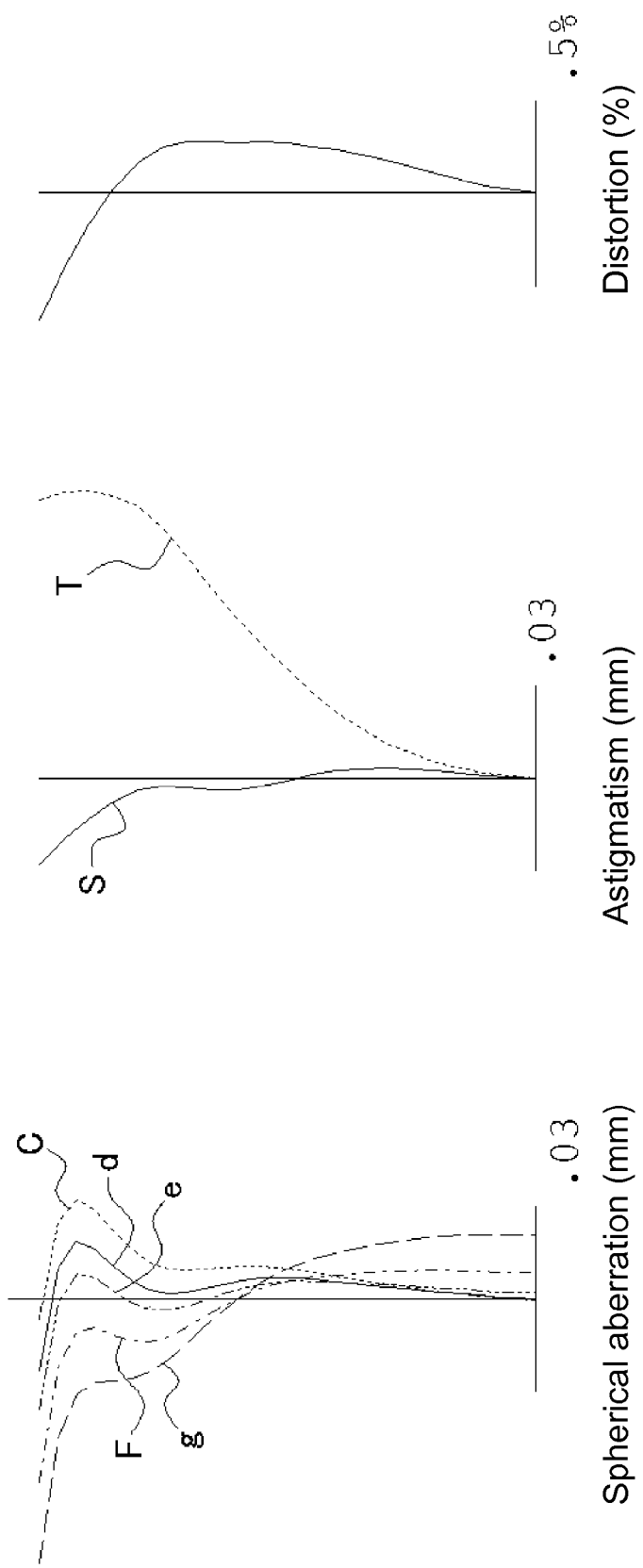
FIG. 15 is an aberration diagram showing a spherical aberration, an astigmatism, and a distortion of the imaging lens of FIG. 13.

FIG. 14 shows the lateral aberration that corresponds to the image height ratio H of the imaging lens of Numerical Data Example 5. FIG. 15 shows a spherical aberration (mm), an astigmatism (mm), and a distortion (%), respectively, in the imaging lens of Numerical Data Example 5. As shown in FIGS. 14 and 15, according to the imaging lens of Numerical Data Example 5, the aberrations are satisfactorily corrected.

Furthermore, an angle of view (2ω) of each imaging lens in Numerical Data Examples 1 to 5 is 72.0°, 71.6°, 71.2°, 71.8°, and 72.0°, which are wider than those in conventional imaging lenses. For this reason, according to the imaging lens of the embodiment, it is possible to take an image of wider range than that taken by a conventional imaging lens.

Accordingly, when the imaging lens of the embodiment is applied to an imaging optical system of a camera for mounting in portable devices such as cellular phones, portable information terminals, and smart-phones, a digital still camera, a security camera, an onboard camera, a network camera, and the like, it is possible to achieve both high functionality and the small size for the camera and the like.

The invention can be applied in a device that requires relatively wide angle of view as well as a small size and satisfactory aberration correcting ability as an imaging lens, e.g., an imaging lens for mounting in a cellular phone and a smart phone, and the like.

The disclosure of Japanese Patent Application No. 2011-236598, filed on Oct. 28, 2011, is incorporated in the application by reference.

While the invention has been explained with reference to the specific embodiments of the invention, the explanation is illustrative and the invention is limited only by the appended claims.

What is claimed is:

1. An imaging lens comprising:
a first lens having negative refractive power;
a second lens having positive refractive power;
a third lens having negative refractive power; and
a fourth lens having positive refractive power, arranged in this order from an object side to an image plane side,
wherein said second lens is formed in a shape so that a curvature radius of a surface thereof on the object side and a curvature radius of a surface thereof on the image plane side are both positive,
said third lens is formed in a shape so that a curvature radius of a surface thereof on the object side and a curvature radius of a surface thereof on the image plane side are both negative,
said fourth lens is formed in a shape so that a curvature radius of a surface thereof on the object side and a curvature radius of a surface thereof on the image plane side are both positive, and
said first lens has a focal length f1 and said second lens has a focal length f2 so that the following conditional expression is satisfied:

−0.6<$f2/f1$≤−0.29, said fourth lens has a focal length f4 so that the following conditional expression is satisfied:

0.7<$f2/f4$<1.0, said third lens has the surface on the image plane side having the curvature radius R3r and said fourth lens has the surface on the object side having the curvature radius R4f so that the following conditional expression is satisfied:

−1.8<$R3r/R4f$<−0.8, and said second lens has the surface on the object side having the curvature radius R2f so that the following conditional expression is satisfied:

0.15<$R2f/f$<0.35 where f is a focal length of a whole lens system.

2. The imaging lens according to claim 1, wherein said first lens has the surface on the object side having the curvature radius R1f so that the following conditional expression is satisfied:

0<$f/R1f$<2.0 where f is a focal length of a whole lens system.

3. An imaging lens comprising:
a first lens having negative refractive power;
a second lens having positive refractive power;
a third lens having negative refractive power; and
a fourth lens having positive refractive power, arranged in this order from an object side to an image plane side,
wherein said second lens is formed in a shape so that a curvature radius of a surface thereof on the object side and a curvature radius of a surface thereof on the image plane side are both positive,
said third lens is formed in a shape so that a curvature radius of a surface thereof on the object side and a curvature radius of a surface thereof on the image plane side are both negative,
said fourth lens is formed in a shape so that a curvature radius of a surface thereof on the object side and a curvature radius of a surface thereof on the image plane side are both positive, and
said first lens has a focal length f1 and said second lens has a focal length f2 so that the following conditional expression is satisfied:

−0.6<$f2/f1$<−0.29, said third lens has a focal length f3 and said fourth lens has a focal length f4 so that the following conditional expression is satisfied:

$0.7<|f3/f4|<1.0$, said third lens has the surface on the image plane side having the curvature radius R3$r$ and said fourth lens has the surface on the object side having the curvature radius R4$f$ so that the following conditional expression is satisfied:

$-1.8<R3r/R4f<-0.8$, and said second lens has the surface on the object side having the curvature radius R2$f$ so that the following conditional expression is satisfied:

$0.15<R2f/f<0.35$ where f is a focal length of a whole lens system.

4. The imaging lens according to claim 3, wherein said first lens has the surface on the object side having the curvature radius R1$f$ so that the following conditional expression is satisfied:

$0<f/R1f<2.0$ where f is a focal length of a whole lens system.

\* \* \* \* \*